(12) United States Patent
Xu

(10) Patent No.: US 12,006,431 B2
(45) Date of Patent: Jun. 11, 2024

(54) OVERMOLDING THERMOPLASTIC ELASTOMER COMPOUNDS HAVING HIGH BIO-BASED CONTENT

(71) Applicant: Avient Corporation, Avon Lake, OH (US)

(72) Inventor: Liang Xu, Vernon Hills, IL (US)

(73) Assignee: Avient Corporation, Avon Lake, OH (US)

( * ) Notice: Subject to any disclaimer, the term of this patent is extended or adjusted under 35 U.S.C. 154(b) by 338 days.

(21) Appl. No.: 17/294,174

(22) PCT Filed: Nov. 11, 2019

(86) PCT No.: PCT/US2019/060713
§ 371 (c)(1),
(2) Date: May 14, 2021

(87) PCT Pub. No.: WO2020/102074
PCT Pub. Date: May 22, 2020

(65) Prior Publication Data
US 2022/0010127 A1    Jan. 13, 2022

Related U.S. Application Data

(60) Provisional application No. 62/768,394, filed on Nov. 16, 2018.

(51) Int. Cl.
| | |
|---|---|
| *C08L 67/02* | (2006.01) |
| *B32B 27/08* | (2006.01) |
| *B32B 27/30* | (2006.01) |
| *B32B 27/36* | (2006.01) |
| *C08L 53/02* | (2006.01) |
| *C08L 67/00* | (2006.01) |
| *B32B 25/08* | (2006.01) |
| *B32B 25/14* | (2006.01) |

(52) U.S. Cl.
CPC .............. *C08L 67/00* (2013.01); *B32B 27/08* (2013.01); *B32B 27/302* (2013.01); *B32B 27/36* (2013.01); *B32B 27/365* (2013.01); *C08L 53/025* (2013.01); *C08L 67/025* (2013.01); *B32B 25/08* (2013.01); *B32B 25/14* (2013.01); *C08L 2205/02* (2013.01); *C08L 2205/035* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 2014/0094538 A1 | 4/2014 | Kim | |
| 2016/0108228 A1* | 4/2016 | Sasaki | C08K 5/01 |
| | | | 524/505 |
| 2016/0230000 A1 | 8/2016 | Gu | |
| 2016/0297956 A1 | 10/2016 | Sasaki et al. | |
| 2016/0312023 A1 | 10/2016 | Tanaka et al. | |
| 2020/0207974 A1* | 7/2020 | Xu | C08L 23/06 |
| 2020/0240076 A1* | 7/2020 | Belloni | D06N 3/14 |

FOREIGN PATENT DOCUMENTS

| | | |
|---|---|---|
| CN | 104140633 A | 11/2014 |
| CN | 105229076 A | 1/2016 |
| CN | 105246971 A | 1/2016 |
| CN | 105934479 A | 9/2016 |
| CN | 107207829 A | 9/2017 |
| EP | 2334707 B1 | 2/2012 |
| WO | WO 2018/200957 * | 11/2018 |
| WO | 2018232200 A1 | 12/2018 |

OTHER PUBLICATIONS

SPB 608—Braskem, retrieved May 18, 2023. (Year: 2022).*
Hytrel RS—DuPont, retrieved May 18, 2018. (Year: 2009).*
Hussain, Significant Enhancement of Mechanical and Thermal Properties of Thermoplastic Polyester Elastomer by Polymer Blending and Nanoinclusion; Journal of Nanomaterials vol. 216 (2016) pp. 1-9. (Year: 2016).*
Barton; Genomatica presentation of "A Process for the Production of Bio-based 1,4 Butanediol" at the Pacific Rim Summit on Industrial Biotechnology & Bioenergy (2012) pp. 1-23. (Year: 2012).*
Gotro; Bio Polyethyelene: Drop-in Repacement; Polymer Innovation Blog (2013) pp. 1-3. (Year: 2013).*

* cited by examiner

*Primary Examiner* — David J Buttner
(74) *Attorney, Agent, or Firm* — Michael J. Sambrook; Emily E. Vlasek; David V. Monateri

(57) ABSTRACT

Thermoplastic elastomer compounds include (a) hydrogenated styrene-farnesene-styrene block copolymer, (b) thermoplastic polyester elastomer having a bio-based content of at least about 45%, (c) polyolefin having a bio-based content of at least about 95%, (d) secondary styrenic block copolymer such as styrene-ethylene/butylene-styrene block copolymer, and (e) plasticizer. The thermoplastic elastomer compounds have a bio-based content of at least about 40%. Additionally, the thermoplastic elastomer compounds have an adhesion of at least about 10 pli according to a 90° Peel Test on at least one of acrylonitrile butadiene styrene, polycarbonate/acrylonitrile butadiene styrene, and polycarbonate. The thermoplastic elastomer compounds can be especially useful for making overmolded thermoplastic articles.

12 Claims, No Drawings

OVERMOLDING THERMOPLASTIC ELASTOMER COMPOUNDS HAVING HIGH BIO-BASED CONTENT

CLAIM OF PRIORITY

This application claims priority to U.S. Provisional Patent Application Ser. No. 62/768,394 bearing and filed on Nov. 16, 2018, which is incorporated by reference.

FIELD OF THE INVENTION

This invention relates to thermoplastic elastomer compounds which have relatively high bio-based content and can be overmolded with good adhesion onto thermoplastic substrates molded from acrylonitrile butadiene styrene, polycarbonate/acrylonitrile butadiene styrene, and/or polycarbonate.

BACKGROUND OF THE INVENTION

Demand exists for overmolded thermoplastic articles in a variety of markets and product applications. Non-limiting examples include consumer products, electronics and accessories, automotive and transportation, and healthcare and medical. Often, overmolding is used for providing products or parts with improved tactile qualities such as "grip-ability" or "soft touch" or "silky feel". Increasingly, overmolding is used also to provide products or parts with improved functionality such as vibration damping or impact protection.

Generally, overmolding is an injection molding process whereby one material (an overmold material) such as a thermoplastic elastomer is molded onto a second material (a substrate material) such as a rigid thermoplastic to provide a single product or part. When the overmold material and the substrate material are properly selected, the overmold material forms a strong bond with the substrate material without the need for primers or adhesives.

Thermoplastic elastomers, which can be used as the overmold material, are polymer materials that exhibit elasticity while also being thermoplastic. Commonly used thermoplastic elastomers (TPE) include styrenic block copolymers (SBC) which can consist of two styrenic hard end blocks and an olefinic soft middle block. Examples include styrene-ethylene/butylene-styrene (SEBS) block copolymer. Although useful as an overmold material for various applications, such conventional TPE materials are derived from petroleum-based resources.

More recently, bio-based TPE materials, which may be desirable for certain markets and product applications, have become commercially available. Non-limiting examples include hydrogenated farnesene-styrene block copolymers (HFSC) available under "BIO-series" series of the SEPTON brand from Kuraray and thermoplastic polyester elastomers (bio-COPE) under the "RS" series of the HYTREL brand from DuPont.

Disadvantageously, however, thermoplastic elastomer compounds which include either HFSC or bio-COPE do not adhere when overmolded onto thermoplastic substrates molded from acrylonitrile butadiene styrene, polycarbonate/acrylonitrile butadiene styrene, and/or polycarbonate.

SUMMARY OF THE INVENTION

Consequently, a need exists for thermoplastic elastomer compounds which include bio-based materials and can be overmolded with good adhesion onto thermoplastic substrates molded from acrylonitrile butadiene styrene, polycarbonate/acrylonitrile butadiene styrene, and/or polycarbonate.

The aforementioned needs are met by one or more aspects of the disclosed invention.

According to aspects of the invention, thermoplastic elastomer compounds which include HFSC and bio-COPE in combination as disclosed herein can be overmolded with good adhesion onto thermoplastic substrates molded from acrylonitrile butadiene styrene (ABS), polycarbonate/acrylonitrile butadiene styrene (PC/ABS), and/or polycarbonate (PC), even though thermoplastic elastomer compounds which include either HFSC or bio-COPE, but not both HFSC and bio-COPE, do not adhere when overmolded onto thermoplastic substrates molded from ABS, PC/ABS, and/or PC.

One aspect of the invention is thermoplastic elastomer compounds including (a) hydrogenated farnesene-styrene block copolymer (HFSC), (b) thermoplastic polyester elastomer having a bio-based content of at least about 45%, (c) polyolefin having a bio-based content of at least about 95%, (d) secondary styrenic block copolymer such as styrene-ethylene/butylene-styrene block copolymer, and (e) plasticizer. The thermoplastic elastomer compounds have a bio-based content of at least about 40%. Additionally, the thermoplastic elastomer compounds have an adhesion of at least about 10 pli according to a 90° Peel Test on at least one of acrylonitrile butadiene styrene (ABS), polycarbonate/acrylonitrile butadiene styrene (PC/ABS), and polycarbonate (PC).

Another aspect of the invention is thermoplastic articles molded from the thermoplastic elastomer compounds as described herein.

A further aspect of the invention is overmolded thermoplastic articles including (a) an overmold portion molded from the thermoplastic elastomer compounds as described herein; and (b) a substrate portion molded from a thermoplastic resin compound comprising thermoplastic polymer resin. The overmold portion is bonded onto the substrate portion at a bond interface, and the bond interface is free of adhesive.

An even further aspect of the invention is methods of making overmolded thermoplastic articles which have a substrate portion and an overmold portion. The methods include the steps of (a) providing the thermoplastic elastomer compound as described herein, (b) providing a thermoplastic resin compound comprising thermoplastic polymer resin, (c) molding the thermoplastic resin compound to provide the substrate portion, and (d) overmolding the thermoplastic elastomer compound to provide the overmold portion. The overmold portion is bonded onto the substrate portion at a bond interface, and the bond interface is free of adhesive, thereby providing the overmolded thermoplastic article.

Features of the invention will become apparent with reference to the following embodiments. There exist various refinements of the features noted in relation to the above-mentioned aspects of the disclosed invention. Additional features may also be incorporated in the above-mentioned aspects of the disclosed invention. These refinements and additional features may exist individually or in any combination. For instance, various features discussed below in relation to any of the described aspects of the invention may be incorporated into any of the described aspects of the invention alone or in any combination.

EMBODIMENTS OF THE INVENTION

In some embodiments, the invention is directed to thermoplastic elastomer compounds.

In other embodiments, the invention is directed to thermoplastic articles.

In further embodiments, the invention is directed to overmolded thermoplastic articles.

In even further embodiments, the invention is directed to methods of making overmolded thermoplastic articles.

Required and optional features of these and other embodiments of the disclosed invention are described.

As used herein, the term "bio-based content" means (a) as determined according to ASTM D6866; or (b) as reported by a manufacturer for a particular ingredient or substance; or (c) as calculated for a compound including a combination of multiple ingredients or substances using those values as reported by the manufacturer for each particular ingredient or substance.

As used herein, the term "compound" means a composition or mixture resulting from melt mixing, or compounding, a neat polymer and at least one other ingredient including but not limited to one or more additives, or one or more other polymers, or both.

As used herein, the term "molded from" means, with respect to an article (or component of an article) and a material, that the article (or component of the article) is molded, extruded, shaped, formed, or otherwise made from the material. As such, the term "molded from" means, in some embodiments, the article (or component of an article) can comprise, consist essentially of, or consist of, the material; and, in other embodiments, the article (or component of an article) consists of the material because the article (or component of an article) is, for example, made by an injection molding process.

As used herein, "90° Peel Test" means a peel strength test according to ASTM D903 except as modified pursuant to the following:

An overmold portion of a test specimen is provided by injection molding a thermoplastic elastomer compound in the form of a strip measuring 2.54 cm (1 inch) wide and 10.16 cm (4 inches) long and 0.15 cm (0.06 inches) thick.

A test specimen is provided by overmolding to adhere a first portion of the overmold portion measuring 17.78 cm (7 inches) long onto a substrate portion molded from a thermoplastic resin compound. A second portion of the overmold portion measuring 2.54 cm (1 inch) is not adhered to the substrate portion.

Using an INSTRON tensile testing machine operating at 2 inches/min (5.08 cm/min) as the pulling speed, the second portion (i.e., not adhered) of the overmold portion is pulled at a 90° angle from the surface of the substrate portion. The substrate portion is secured in its place on wheels in order to maintain the 90° angle as the overmold portion is pulled.

The adhesion strength, which corresponds to the peel strength, is measured as the force required to pull the overmold portion orthogonally from the substrate portion to which the overmold portion is adhered.

The adhesion strength is recorded as the average strength over 12.7 cm (5 inches) of delamination occurring from the pulling.

The test is repeated for a second identical test specimen and an average of the two recorded adhesion strengths is reported as the result.

The result is expressed in pounds-force per linear inch (pli), wherein each wherein each pound-force per inch equals approximately 0.175 Newtons per millimeter (N/mm).

Thermoplastic Elastomer Compounds

Some aspects of the invention are directed to thermoplastic elastomer compounds.

Thermoplastic elastomer compounds include (a) hydrogenated farnesene-styrene block copolymer (HFSC); (b) thermoplastic polyester elastomer having a bio-based content of at least about 45% (bio-COPE); (c) polyolefin having a bio-based content of at least about 95%; (d) secondary styrenic block copolymer such as styrene-ethylene/butylene-styrene block copolymer; and (e) plasticizer. The thermoplastic elastomer compounds have a bio-based content of at least about 40%. Additionally, the thermoplastic elastomer compounds have an adhesion of at least about 10 pli according to a 90° Peel Test on at least one of acrylonitrile butadiene styrene (ABS), polycarbonate/acrylonitrile butadiene styrene (PC/ABS), and polycarbonate (PC).

According to aspects of the invention, thermoplastic elastomer compounds which include HFSC and bio-COPE in combination as disclosed herein can be overmolded with good adhesion onto thermoplastic substrates molded from acrylonitrile butadiene styrene (ABS), polycarbonate/acrylonitrile butadiene styrene (PC/ABS), and/or polycarbonate (PC), even though thermoplastic elastomer compounds which include either HFSC or bio-COPE, but not both HFSC and bio-COPE, do not adhere when overmolded onto thermoplastic substrates molded from ABS, PC/ABS, and/or PC.

In some embodiments, the thermoplastic elastomer compounds have a bio-based content of at least about 50%.

In some embodiments, the thermoplastic elastomer compounds have an adhesion of at least about 10 pli according to a 90° Peel Test on each of acrylonitrile butadiene styrene (ABS), polycarbonate/acrylonitrile butadiene styrene (PC/ABS), and polycarbonate (PC).

In some embodiments, the thermoplastic elastomer compounds further include hydrocarbon resin.

In some embodiments, the thermoplastic elastomer compounds further include one or more additives such as those additives selected from the group consisting of antioxidants; colorants; ultraviolet light absorbers; waxes; and combinations thereof.

Hydrogenated Farnesene-Styrene Block Copolymer

According to the invention, thermoplastic elastomer compounds include hydrogenated farnesene-styrene block copolymer (HFSC).

Suitable HFSC includes commercially available materials such as hydrogenated styrene-farnesene-styrene block copolymer, which also could be referred to as polystyrene-poly (hydrogenated farnesene)-polystyrene or hydrogenated polystyrene-polyfarnesene-polystyrene. That is, suitable HFSC includes a triblock copolymer consisting of two hard end blocks of polystyrene and a soft middle block of poly(hydrogenated farnesene). More particularly, in some embodiments, the farnesene is β-farnesene. In such commercially available materials, the farnesene monomer is derived from sugarcane or other biorenewable sources.

In some embodiments, thermoplastic elastomer compounds include a single commercial grade of HFSC.

In other embodiments, thermoplastic elastomer compounds include a combination of two or more different commercial grades of HFSC. For example, in some embodiments, thermoplastic elastomer compounds include a combination of a first grade of hydrogenated styrene-farnesene-styrene block copolymer and a second grade of hydrogenated styrene-farnesene-styrene block copolymer, wherein the first grade of hydrogenated styrene-farnesene-styrene block copolymer has a first melt flow rate and a first hardness and the second grade of hydrogenated styrene-farnesene-styrene block copolymer has a second melt flow rate different from the first melt flow rate and a second hardness different from the first hardness.

In some embodiments including a first grade of hydrogenated styrene-farnesene-styrene block copolymer and a second grade of hydrogenated styrene-farnesene-styrene block copolymer, the first grade of hydrogenated styrene-farnesene-styrene block copolymer and the second grade of hydrogenated styrene-farnesene-styrene block copolymer are present at a weight ratio ranging from about 1:5 to about 5:1, or about 1:4 to about 4:1, or about 1:3 to about 3:1.

Non-limiting examples of commercially available HFSC include those available under "BIO-series" series of the SEPTON brand from Kuraray, including grades SF 901, SF 902, and SF 903, which are differentiated at least by melt flow rate and Shore A hardness. As reported by the manufacturer, SF 901 has a bio-based content of about 68% and a styrene content of about 30%; SF 902 has a bio-based content of about 80% and a styrene content of 20%; and SF 903 has a bio-based content of about 68% and a styrene content of 30%.

Bio-Based Thermoplastic Polyester Elastomer

According to the invention, thermoplastic elastomer compounds include thermoplastic polyester elastomer having a bio-based content of at least about 45% (bio-COPE).

Suitable bio-COPE includes commercially available materials such as block copolymers including a hard block of polyester and soft block of polyether, provided that the bio-based content is at least about 45%. In such commercial available materials, the polyether soft block is derived from biorenewable sources.

In some embodiments, suitable bio-COPE has a bio-based content of at least about 50%.

Non-limiting examples of commercially available bio-COPE include those available under the "RS" series of the HYTREL brand from DuPont, including grade RS40F3.

Bio-Based Polyolefin

According to the invention, thermoplastic elastomer compounds include polyolefin having a bio-based content of at least about 95%.

Suitable bio-based polyolefins include commercially available materials in which at least a portion of the feedstock for polymerization is sugarcane or another biorenewable source, provided that the bio-based content is at least about 95%.

In some embodiments, the bio-based polyolefin is bio-based polyethylene.

Non-limiting examples of commercially available bio-based polyolefins include those available from Braskem such as grade SPB608 low density polyethylene.

Secondary Styrenic Block Copolymer

According to the invention, thermoplastic elastomer compounds include secondary styrenic block copolymer; that is, styrenic block copolymer other than the HFSC which itself is styrenic block copolymer.

Suitable secondary styrenic block copolymer includes conventional and commercially available materials.

Non-limiting examples of suitable secondary styrenic block copolymer include styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

In some embodiments, the secondary styrenic block copolymer is styrene-ethylene/butylene-styrene (SEBS) block copolymer.

Non-limiting examples of commercial available secondary styrenic block copolymer include those available under the KRATON brand from Kraton, including grade G1642.

Plasticizer

According to the invention, thermoplastic elastomer compounds include plasticizer.

Suitable plasticizer includes conventional or commercially available oils capable of plasticizing styrenic block copolymer, such as mineral oil, vegetable oil, synthetic oil, etc.

Non-limiting examples of commercially available oils include those available under the PURETOL brand from Petro-Canada, including grade PSO 380.

Optional Hydrocarbon Resin

In some embodiments, thermoplastic elastomer compounds include hydrocarbon resin.

Suitable hydrocarbon resins include conventional or commercially available hydrocarbon resins, such as hydrocarbon resins having a high softening point and a low molecular weight and which are produced by copolymerization of pure aromatic monomers.

Non-limiting examples of commercially available hydrocarbon resins include those available under the KRISTALEX brand from Eastman, including grade 5140.

Optional Additives

In some embodiments, thermoplastic elastomer compounds include one or more optional additives.

Suitable optional additives include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the overmolded thermoplastic article. The amount should not be wasteful of the additive nor detrimental to the processing or performance of the thermoplastic elastomer compound and/or the thermoplastic article.

Non-limiting examples of additives suitable for use in the disclosed invention include one or more selected from antioxidants; colorants; ultraviolet light absorbers; waxes; and combinations thereof.

Ranges of Ingredients in the TPE Compounds

Table 1 below shows the acceptable, desirable, and preferable ranges of ingredients for various embodiments of the thermoplastic elastomer compounds of the invention in terms of weight percent based on total weight of the thermoplastic elastomer compound. Other possible ranges of ingredients for certain embodiments of the disclosed invention are as described elsewhere herein.

Thermoplastic elastomer compounds of the disclosed invention can comprise, consist essentially of, or consist of these ingredients. Any number between the ends of the ranges is also contemplated as an end of a range, such that all possible combinations are contemplated within the possibilities of Table 1 as embodiments of compounds for use in the disclosed invention. Unless expressly stated otherwise herein, any disclosed number is intended to refer to both exactly the disclosed number and "about" the disclosed number, such that either possibility is contemplated within the possibilities of Table 1 as embodiments of compounds for use in the disclosed invention.

TABLE 1

Thermoplastic Elastomer Compound (wt. %)

| Ingredient | Acceptable | Desirable | Preferable |
|---|---|---|---|
| HSFC | 10 to 65 | 15 to 55 | 30 to 40 |
| Bio-based Polyester Elastomer | 10 to 65 | 15 to 55 | 30 to 40 |
| Bio-based Polyolefin | 2 to 20 | 2 to 15 | 3 to 10 |
| Secondary Styrenic Block Copolymer | 2 to 20 | 2 to 15 | 4 to 10 |
| Plasticizer | 2 to 20 | 5 to 17 | 10 to 15 |
| Optional Hydrocarbon Resin | 0 to 15 | 2 to 10 | 3 to 7 |
| Optional Additives | 0 to 10 | 0 to 5 | 0 to 2 |

In some embodiments, the hydrogenated styrene-farnesene-styrene block copolymer and the thermoplastic polyester elastomer are present at a weight ratio ranging from about 1:2 to about 2:1, for example, about 1:1.

Processing

Preparation of the thermoplastic elastomer compounds of the disclosed invention is uncomplicated once the proper ingredients have been selected. The compounds can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 400 rpm to about 600 rpm. Typically, the output from the extruder is pelletized for later processing.

Subsequent preparation of overmolded thermoplastic articles of the disclosed invention also is uncomplicated once thermoplastic resin compounds and thermoplastic elastomer compounds of the disclosed invention are provided.

Overmolding processes are described in available references, for example, Jin Kuk Kim et al. (editors), *Multicomponent Polymeric Materials* (Springer 2016); Dominick V. Rosato et al., *Plastics Design Handbook* (Springer 2013); GLS Corporation, *Overmolding Guide* (2004). Typically, it is recommended for overmolding to avoid the use of mold release sprays and similar lubricants applied to the mold cavity because they can interfere with bonding between the substrate material and the overmold material.

Thermoplastic Articles

Some aspects of the invention are directed to thermoplastic articles molded from thermoplastic elastomer compounds of the disclosed invention.

Other aspects of the invention are directed to overmolded thermoplastic articles. Overmolded thermoplastic articles include an overmold portion molded from a thermoplastic elastomer compound of the disclosed invention and a substrate portion molded from a thermoplastic resin compound. The overmold portion is bonded onto the substrate portion at a bond interface, and the bond interface is free of adhesive.

The substrate portion of the overmolded thermoplastic article is molded from a thermoplastic resin compound. The thermoplastic resin compound includes one or more thermoplastic resins. In some embodiments, the thermoplastic resin compound further includes one or more optional additives. Thermoplastic resin compounds of the disclosed invention can comprise, consist essentially of, or consist of these ingredients.

In some embodiments, the thermoplastic resin compound includes one or more thermoplastic polymer resins in an amount of about 100 weight percent by weight of the thermoplastic resin compound. That is, in some embodiments, the thermoplastic resin compound is neat thermoplastic polymer resin. In other embodiments, the thermoplastic resin compound includes one or more thermoplastic polymer resins in an amount of, for example, at least about 50 weight percent, or at least about 75 weight percent, or at least about 90 weight percent, or at least about 99 weight percent, or at least about 99.9 weight percent, by weight of the thermoplastic resin compound, and the balance includes one or more optional additives.

Suitable thermoplastic polymer resins include conventional or commercially available thermoplastic polymer resins. A thermoplastic polymer resin can be used alone or in combination with one or more other thermoplastic polymer resins.

In some embodiments, the thermoplastic resin is a thermoplastic engineering resin. Non-limiting examples of thermoplastic engineering resins suitable for use in the disclosed invention include polycarbonates, acrylonitrile butadiene styrenes, polyamides, polystyrenes, polyesters, polyoxymethylenes, polyphenylene oxides, and alloys or blends thereof.

In some embodiments, the thermoplastic resin compound further includes one or more optional additives. Suitable optional additive include conventional or commercially available plastics additives as described above for the thermoplastic elastomer compound and any others as can be selected by those skilled in the art, provided that they are selected and used in amounts that are not wasteful nor detrimental to the processing or performance of the thermoplastic resin compound and/or the overmolded thermoplastic article.

Methods of Making Overmolded Thermoplastic Articles

Some aspects of the invention are directed to methods of making an overmolded thermoplastic article having a substrate portion and an overmold portion.

According to the invention, the method includes the steps of: (a) providing a thermoplastic elastomer compound of the disclosed invention; (b) providing a thermoplastic resin compound; (c) molding the thermoplastic resin compound to provide the substrate portion; and (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

Overmolded thermoplastic articles made according to the methods described herein can include any combination of the features described herein for the overmolded thermoplastic articles of the disclosed invention.

USEFULNESS OF THE INVENTION

According to aspects of the invention, the thermoplastic elastomer compounds as described herein have high bio-based content (i.e., at least about 40%) and can be overmolded with good adhesion onto thermoplastic substrates molded from acrylonitrile butadiene styrene, polycarbonate/acrylonitrile butadiene styrene, and/or polycarbonate, to provide overmolded thermoplastic articles for use in a variety of markets and product applications.

Thermoplastic articles of the disclosed invention, including overmolded thermoplastic articles of the disclosed invention, have potential for a variety of applications in many different industries, including but not limited to: appliances; consumer products; electrical and electronic devices and their accessories; healthcare and medical; industrial products equipment; transportation including automotive; wire and cable; and other industries or applications benefiting from the article's unique combination of properties.

For example, the disclosed invention could be used for any thermoplastic article designed for gripping by the human hand and for which a relatively high bio-based content is desirable.

EXAMPLES

Non-limiting examples of thermoplastic elastomer compounds of various embodiments of the disclosed invention are provided.

Table 2 below shows sources of ingredients for the thermoplastic elastomer compounds of Examples 1 to 10 and Comparative Examples A to J.

TABLE 2

| Ingredient Description | Brand | Source |
|---|---|---|
| Hydrogenated styrene-farnesene-styrene block copolymer (bio-based) | SF 903 | Kuraray |
| Hydrogenated styrene-farnesene-styrene block copolymer (bio-based) | SF-902 | Kuraray |
| Hydrogenated styrene-farnesene-styrene block copolymer (bio-based) | SF-901 | Kuraray |
| Thermoplastic polyester elastomer (bio-based) | HYTREL RS 40F3 | DuPont |
| Hydrocarbon resin | KRISTALEX 5140 | Eastman |
| Polyethylene (bio-based) | SPB 608 | Braskem |
| Styrene-ethylene/butylene-styrene block copolymer | KRATON G1642 | Kraton |
| Mineral oil | PURETOL PSO 380 | Petro Canada |
| Antioxidant | IRGAFOS 168 | BASF |
| Antioxidant | IRGAFOS 1010 | BASF |
| Wax | KENAMIDE E | PMC Biogenix |

Examples of the thermoplastic elastomer compound were compounded and extruded as pellets on a twin screw extruder at a temperature of 200° C. and a mixing speed of 500 rpm. Subsequently, test specimens were prepared by injection molding and then evaluated for the reported properties.

Table 3 below shows the formulations and certain properties of Examples 1 to 2 and Comparative Example A.

TABLE 3

| | Example | | |
|---|---|---|---|
| Ingredients | 1 | 2 | A |
| | wt. % | | |
| SF 901 | — | 37.90 | — |
| SF 902 | 37.90 | — | — |
| SF 903 | — | — | 37.90 |
| HYTREL RS 40F3 | 37.90 | 37.90 | 37.90 |
| KRISTALEX 5140 | — | — | — |
| SPB 608 | 4.08 | 4.08 | 4.08 |
| KRATON G1642 | 5.83 | 5.83 | 5.83 |
| PURETOL PSO 380 | 13.99 | 13.99 | 13.99 |
| IRGAFOS 168 | 0.18 | 0.18 | 0.18 |
| IRGAFOS 1010 | 0.04 | 0.04 | 0.04 |
| KENAMIDE E | 0.09 | 0.09 | 0.09 |
| TOTAL | 100 | 100 | 100 |

TABLE 3-continued

| | Example | | |
|---|---|---|---|
| Ingredients | 1 | 2 | A |
| | wt. % | | |
| Properties | | | |
| Hardness (Shore A) (ASTM D2240, 10 s delay) | 53 | 55 | 56 |
| Tensile strength (psi) (ASTM D412, Die C) | 482 | 760 | 683 |
| Elongation (%) (ASTM D412, Die C) | 266 | 354 | 321 |
| 90° Peel Test on ABS (pli) | 11 | 0 | 6 |
| 90° Peel Test on PC/ABS (pli) | 12 | 14 | 0 |
| 90° Peel Test on PC (pli) | 10 | 12 | 0 |
| Calculated bio-based content (%) | 53 | 48 | 48 |

Table 4 below shows the formulations and certain properties of Comparative Examples B to E.

TABLE 4

| | Example | | | |
|---|---|---|---|---|
| Ingredients | B | C | D | E |
| | Wt. % | | | |
| SF 901 | — | — | 75.79 | — |
| SF 902 | — | 75.79 | — | — |
| SF 903 | — | — | — | 75.79 |
| HYTREL RS 40F3 | 75.79 | — | — | — |
| KRISTALEX 5140 | — | — | — | — |
| SPB 608 | 4.08 | 4.08 | 4.08 | 4.08 |
| KRATON G1642 | 5.83 | 5.83 | 5.83 | 5.83 |
| PURETOL PSO 380 | 13.99 | 13.99 | 13.99 | 13.99 |
| IRGAFOS 168 | 0.18 | 0.18 | 0.18 | 0.18 |
| IRGAFOS 1010 | 0.04 | 0.04 | 0.04 | 0.04 |
| KENAMIDE E | 0.09 | 0.09 | 0.09 | 0.09 |
| TOTAL | 100 | 100 | 100 | 100 |
| Properties | | | | |
| Hardness (Shore A) (ASTM D2240, 10 s delay) | 71 | 10 | 20 | 21 |
| Tensile strength (psi) (ASTM D412, Die C) | 555 | 134 | 372 | 213 |
| Elongation (%) (ASTM D412, Die C) | 167 | 376 | 260 | 258 |
| 90° Peel Test on ABS (pli) | 0 | 0 | 0 | 0 |
| 90° Peel Test on PC/ABS (pli) | 0 | 0 | 0 | 0 |
| 90° Peel Test on PC (pli) | 0 | 0 | 0 | 0 |
| Calculated bio-based content (%) | 41 | 64 | 55 | 55 |

Table 5 below shows the formulations and certain properties of Examples 3 to 4 and Comparative Example F.

TABLE 5

| | Example | | |
|---|---|---|---|
| Ingredients | 3 | 4 | F |
| | Wt. % | | |
| SF 901 | 28.42 | 18.95 | 9.47 |
| SF 902 | — | — | — |
| SF 903 | 9.47 | 18.95 | 28.42 |
| HYTREL RS 40F3 | 37.90 | 37.90 | 37.90 |

TABLE 5-continued

| Ingredients | Example 3 | Example 4 Wt. % | Example F |
|---|---|---|---|
| KRISTALEX 5140 | — | — | — |
| SPB 608 | 4.08 | 4.08 | 4.08 |
| KRATON G1642 | 5.83 | 5.83 | 5.83 |
| PURETOL PSO 380 | 13.99 | 13.99 | 13.99 |
| IRGAFOS 168 | 0.18 | 0.18 | 0.18 |
| IRGAFOS 1010 | 0.04 | 0.04 | 0.04 |
| KENAMIDE E | 0.09 | 0.09 | 0.09 |
| TOTAL | 100 | 100 | 100 |
| Properties | | | |
| Hardness (Shore A) (ASTM D2240, 10 s delay) | 56 | 54 | 55 |
| Tensile strength (psi) (ASTM D412, Die C) | 764 | 630 | 670 |
| Elongation (%) (ASTM D412, Die C) | 344 | 285 | 313 |
| 90° Peel Test on ABS (pli) | 8 | 5 | 5 |
| 90° Peel Test on PC/ABS (pli) | 10 | 10 | 8 |
| 90° Peel Test on PC (pli) | 0 | 8 | 0 |
| Calculated bio-based content (%) | 48 | 48 | 48 |

Table 6 below shows the formulations and certain properties of Examples 5 to 7.

TABLE 6

| Ingredients | Example 5 | Example 6 Wt. % | Example 7 |
|---|---|---|---|
| SF 901 | 28.42 | 18.95 | 9.47 |
| SF 902 | 9.47 | 18.95 | 28.42 |
| SF 903 | — | — | — |
| HYTREL RS 40F3 | 37.90 | 37.90 | 37.90 |
| KRISTALEX 5140 | — | — | — |
| SPB 608 | 4.08 | 4.08 | 4.08 |
| KRATON G1642 | 5.83 | 5.83 | 5.83 |
| PURETOL PSO 380 | 13.99 | 13.99 | 13.99 |
| IRGAFOS 168 | 0.18 | 0.18 | 0.18 |
| IRGAFOS 1010 | 0.04 | 0.04 | 0.04 |
| KENAMIDE E | 0.09 | 0.09 | 0.09 |
| TOTAL | 100 | 100 | 100 |
| Properties | | | |
| Hardness (Shore A) (ASTM D2240, 10 s delay) | 55 | 56 | 54 |
| Tensile strength (psi) (ASTM D412, Die C) | 753 | 649 | 558 |
| Elongation (%) (ASTM D412, Die C) | 315 | 285 | 254 |
| 90° Peel Test on ABS (pli) | 11 | 14 | 12 |
| 90° Peel Test on PC/ABS (pli) | 13 | 12 | 12 |
| 90° Peel Test on PC (pli) | 15 | 13 | 11 |
| Calculated bio-based content (%) | 50 | 51 | 52 |

Table 7 below shows the formulations and certain properties of Comparative Examples G to J.

TABLE 7

| Ingredients | G | H Wt. % | I | J |
|---|---|---|---|---|
| SF 901 | — | — | 71.62 | — |
| SF 902 | — | 71.62 | — | — |
| SF 903 | — | — | — | 71.62 |
| HYTREL RS 40F3 | 71.62 | — | — | — |
| KRISTALEX 5140 | 5.51 | 5.51 | 5.51 | 5.51 |
| SPB 608 | 3.86 | 3.86 | 3.86 | 3.86 |
| KRATON G1642 | 5.51 | 5.51 | 5.51 | 5.51 |
| PURETOL PSO 380 | 13.22 | 13.22 | 13.22 | 13.22 |
| IRGAFOS 168 | 0.17 | 0.17 | 0.17 | 0.17 |
| IRGAFOS 1010 | 0.04 | 0.04 | 0.04 | 0.04 |
| KENAMIDE E | 0.08 | 0.08 | 0.08 | 0.08 |
| TOTAL | 100 | 100 | 100 | 100 |
| Properties | | | | |
| Hardness (Shore A) (ASTM D2240, 10 s delay) | 74 | 12 | 26 | 25 |
| Tensile strength (psi) (ASTM D412, Die C) | 635 | 196 | 528 | 330 |
| Elongation (%) (ASTM D412, Die C) | 149 | 304 | 250 | 292 |
| 90° Peel Test on ABS (pli) | 0 | 0 | 4 | 0 |
| 90° Peel Test on PC/ABS (pli) | 0 | 0 | 0 | 0 |
| 90° Peel Test on PC (pli) | 0 | 0 | 0 | 0 |
| Calculated bio-based content (%) | 40 | 61 | 52 | 52 |

Table 8 below shows the formulations and certain properties of Examples 8 to 10.

TABLE 8

| Ingredients | Example 8 | Example 9 Wt. % | Example 10 |
|---|---|---|---|
| SF 901 | 26.86 | 17.90 | 8.95 |
| SF 902 | 8.95 | 17.90 | 26.86 |
| SF 903 | — | — | — |
| HYTREL RS 40F3 | 35.81 | 35.81 | 35.82 |
| KRISTALEX 5140 | 5.51 | 5.51 | 5.51 |
| SPB 608 | 3.86 | 3.86 | 3.86 |
| KRATON G1642 | 5.51 | 5.51 | 5.51 |
| PURETOL PSO 380 | 13.22 | 13.22 | 13.22 |
| IRGAFOS 168 | 0.17 | 0.17 | 0.17 |
| IRGAFOS 1010 | 0.04 | 0.04 | 0.04 |
| KENAMIDE E | 0.08 | 0.08 | 0.08 |
| TOTAL | 100 | 100 | 100 |
| Properties | | | |
| Hardness (Shore A) (ASTM D2240, 10 s delay) | 55 | 53 | 53 |
| Tensile strength (psi) (ASTM D412, Die C) | 845 | 740 | 646 |
| Elongation (%) (ASTM D412, Die C) | 371 | 326 | 297 |
| 90° Peel Test on ABS (pli) | 15 | 17 | 16 |
| 90° Peel Test on PC/ABS (pli) | 17 | 15 | 14 |
| 90° Peel Test on PC (pli) | 16 | 15 | 15 |
| Calculated bio-based content (%) | 47 | 48 | 49 |

Without undue experimentation, those having ordinary skill in the art can utilize the written description, including the Examples, to make and use aspects of the disclosed invention.

All documents cited in the Embodiments of the Invention are incorporated herein by reference in their entirety unless otherwise specified. The citation of any document is not to be construed as an admission that it is prior art with respect to the disclosed invention.

While particular embodiments of the disclosed invention have been illustrated and described, it would be obvious to those skilled in the art that various other changes and modifications can be made without departing from the spirit and scope of the invention. The appended claims are intended to cover all such changes and modifications within the scope of the disclosed invention.

What is claimed is:

1. A thermoplastic elastomer compound comprising:
    (a) from about 10 to about 65 weight percent, by weight of the compound, of a hydrogenated styrene-farnesene-styrene block copolymer;
    (b) from about 10 to about 65 weight percent, by weight of the compound, of a thermoplastic polyester elastomer having a bio-based content of at least about 45%;
    (c) from about 2 to about 20 weight percent, by weight of the compound, of a polyolefin having a bio-based content of at least about 95%;
    (d) from about 2 to about 20 weight percent, by weight of the compound, of a secondary styrenic block copolymer;
    (e) from about 2 to about 20 weight percent, by weight of the compound, of a plasticizer;
    (f) from 0 to about 15 weight percent, by weight of the compound, of a hydrocarbon resin; and
    (g) from 0 to about 10 weight percent, by weight of the compound, of one or more additives selected from the group consisting of antioxidants; colorants; ultraviolet light absorbers; waxes; and combinations thereof;
    wherein the compound has a bio-based content of at least about 40%; and
    wherein the compound has an adhesion of at least about 10 pli according to a 90° Peel Test on at least one of acrylonitrile butadiene styrene, polycarbonate/acrylonitrile butadiene styrene, and polycarbonate.

2. The compound of claim 1, wherein the compound has a bio-based content of at least about 50%.

3. The compound of claim 1, wherein the compound has an adhesion of at least about 10 pli according to a 90° Peel Test on each of acrylonitrile butadiene styrene (ABS), polycarbonate/acrylonitrile butadiene styrene (PC/ABS), and polycarbonate (PC).

4. The compound of claim 1, wherein the secondary styrenic block copolymer is selected from styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

5. The compound of claim 1, wherein the compound includes from about 2 to about 10 weight percent, by weight of the compound, of the hydrocarbon resin.

6. The compound of claim 1, wherein the compound further comprises two or more additives selected from the group consisting of antioxidants; colorants; ultraviolet light absorbers; waxes; and combinations thereof.

7. The compound of claim 1, wherein the hydrogenated styrene-farnesene-styrene block copolymer and the thermoplastic polyester elastomer are present at a weight ratio ranging from about 1:2 to about 2:1.

8. The compound of claim 1, wherein the hydrogenated styrene-farnesene-styrene block copolymer comprises a combination of a first grade of hydrogenated styrene-farnesene-styrene block copolymer and a second grade of hydrogenated styrene-farnesene-styrene block copolymer, wherein the first grade of hydrogenated styrene-farnesene-styrene block copolymer has a first melt flow rate and a first hardness and the second grade of hydrogenated styrene-farnesene-styrene block copolymer has a second melt flow rate different from the first melt flow rate and a second hardness different from the first hardness.

9. The compound of claim 8, wherein the first grade of hydrogenated styrene-farnesene-styrene block copolymer and the second grade of hydrogenated styrene-farnesene-styrene block copolymer are present at a weight ratio ranging from about 1:3 to about 3:1.

10. A thermoplastic article molded from the thermoplastic elastomer compound of claim 1.

11. An overmolded thermoplastic article comprising:
    (a) an overmold portion molded from the thermoplastic elastomer compound of claim 1; and
    (b) a substrate portion molded from a thermoplastic resin compound comprising thermoplastic resin selected from the group consisting of acrylonitrile butadiene styrene (ABS), polycarbonate/acrylonitrile butadiene styrene (PC/ABS), and polycarbonate (PC);
    wherein the overmold portion is bonded onto the substrate portion at a bond interface, and the bond interface is free of adhesive.

12. A method of making an overmolded thermoplastic article having a substrate portion and an overmold portion, the method comprising the steps of:
    (a) providing the thermoplastic elastomer compound of claim 1;
    (b) providing a thermoplastic resin compound comprising thermoplastic resin selected from the group consisting of acrylonitrile butadiene styrene, polycarbonate/acrylonitrile butadiene styrene, and polycarbonate;
    (c) molding the thermoplastic resin compound to provide the substrate portion; and
    (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

* * * * *